United States Patent [19]

Nimberger

[11] Patent Number: 5,549,097
[45] Date of Patent: Aug. 27, 1996

[54] VEHICULAR FUEL CONTROL SYSTEM AND METHOD

[75] Inventor: Spencer M. Nimberger, Houston, Tex.

[73] Assignee: PGI International, Ltd., Houston, Tex.

[21] Appl. No.: 456,049

[22] Filed: May 31, 1995

[51] Int. Cl.$^6$ ............................................. F02D 41/22
[52] U.S. Cl. ............. 123/690; 123/198 D; 123/198 DB; 123/529
[58] Field of Search .................. 123/198 D, 198 DB, 123/479, 527, 529, 688, 690

[56] References Cited

U.S. PATENT DOCUMENTS

| | | | |
|---|---|---|---|
| 4,074,672 | 2/1978 | LaDue et al. | 123/198 DC |
| 4,136,329 | 1/1979 | Trobert | 340/459 |
| 4,489,311 | 12/1984 | Lang et al. | 123/198 D X |
| 4,502,444 | 3/1985 | Rubbo et al. | 123/695 |
| 4,534,214 | 8/1985 | Takahashi | 73/118 |
| 4,914,313 | 4/1990 | Clingon et al. | 307/10.1 |

FOREIGN PATENT DOCUMENTS

| | | | |
|---|---|---|---|
| 59-231158 | 12/1984 | Japan | 123/198 D |
| 63-100253 | 5/1988 | Japan | 123/690 |

OTHER PUBLICATIONS

Article: "Reversing the trend of escalating maintenance costs", *Industrial Vehicle Technology* '93.
Brochure: General Information—*Gas Manual*, pp. 9–15.
Brochure: Model AFR-1, *Energy Kinetics Inc.*, 1993.
Brochure: Installations Instructions CO Controller for Forklifts P/N 4047 by Autotronic Controls Corp.
FMS Fuel Management System by ECO Fuel Systems, Inc.

*Primary Examiner*—Tony M. Argenbright
*Attorney, Agent, or Firm*—Browning, Bushman, Anderson & Brookhart

[57] ABSTRACT

A system 10 for controlling the operation of a propane powered vehicle engine includes a gas sensor 28 for providing a fuel rich signal and a fuel lean signal to a controller 20. The controller is also responsive to a tachometer 26 which senses the engine rpm. When the engine speed is in excess of a preselected value and is not decelerating, the controller generates an unacceptable engine operation signal if the period of duration of the fuel rich signal exceeds a preselected value. A warning unit 32 is provided for alerting the operator of a service required signal from the controller. A fuel shutoff device 30 automatically terminates the fuel supply to the engine in response to a fuel shutoff signal from the controller. The method of the invention allows for vehicle startup after the fuel shutoff device has been activated. The invention is particularly well suited for requiring a propane powered vehicle engine to output an acceptable level of carbon monoxide in the exhaust gas.

35 Claims, 3 Drawing Sheets

VEHICULAR FUEL CONTROL SYSTEM AND METHOD

FIELD OF THE INVENTION

The present invention relates to a system for controlling the operation of vehicles to limit the discharge of contaminants in the engine exhaust stream. More particularly, the present invention relates to a system for automatically terminating the supply of propane to a vehicle engine in response to a sensor responsive to the concentration of gasses in the engine exhaust stream.

BACKGROUND OF THE INVENTION

Vehicles powered by liquid propane are increasingly replacing vehicles powered by gasoline or diesel fuel. Primary reasons for this conversion to propane powered vehicles are reduced maintenance costs for operating the vehicles, and reduced emission of harmful contaminants from the vehicle engine. This latter feature is particularly important for forklifts, sweepers, carts and other vehicles which frequently operate within a warehouse, manufacturing plant, or other substantially enclosed buildings. Reduced emission of contaminants from vehicle engines powered by propane is essential to the satisfactory performance of many vehicles. Clean running engines powered by liquid propane deliver the desired power output to the forklift operator, and do not create a harmful environment within the building. Accordingly, forklifts powered by liquid propane are preferred in many applications over battery powered forklifts.

The primary contaminant of concern in the engine exhaust streams of a propane powered vehicle is carbon monoxide (CO). Due to the hazardous nature of this gas, OSHA guidelines strictly regulate the permissible CO level in a workplace. Vehicles operating in a fuel rich mode are a primary generator of carbon monoxide within some workplace environments. Accordingly, various systems have been devised which seek to avoid the fuel rich engine operation mode and maintain the stoichiometric operation of a propane powered engine, thereby effectively limiting the discharge of carbon monoxide from the engine. Those skilled in the industry recognize that a propane powered engine operating at its stoichiometric point releases a small fraction of the carbon monoxide discharged from an engine operating in a fuel rich mode.

A new propane powered vehicle engine is set to operate at its stoichiometric point, but engine wear and use alters the ideal air-to-fuel ratio. Techniques for limiting the carbon monoxide discharge from propane powered vehicles include the periodic check of engine exhaust, and the regular maintenance of engines to insure an acceptable discharge of contaminants from the vehicle. Although such systems are still widely used today, it is difficult to insure acceptable carbon monoxide discharge levels from a vehicle using this technique alone, since vehicle operation and/or maintenance personnel may not regularly and properly maintain stoichiometric engine operation. Moreover, an engine running fuel rich provides the maximum power output, and thus is understandably preferred by the vehicle operator for maximum performance. Although a fuel lean engine mode produces an acceptable carbon monoxide output, engine performance suffers when the engine runs too lean. Accordingly, a slightly fuel lean or stoichiometric engine operation is preferred to both achieve acceptable vehicle performance and insure safe discharge levels of carbon monoxide in the engine exhaust stream.

In an effort to reduce the problems associated with carbon monoxide discharged from a propane powered vehicle engine, various companies have marketed "closed-loop" systems which automatically control the air-to-fuel ratio of an engine in response to the detected oxygen concentration in the exhaust stream, and thereby seek to control the carbon monoxide output. Existing systems utilize a sensor mounted on the vehicle to continually detect oxygen levels in the engine discharge stream. Detected oxygen correlates well with the carbon monoxide concentration in the discharge stream, and reliable oxygen sensors which will not saturate at engine startup cost substantially less than reliable carbon monoxide sensors. These systems seek to maintain the engine in a slightly fuel lean or stoichiometric mode to limit the CO discharge from the vehicle. Closed-loop systems typically include bypass mechanisms to allow the engine to run fuel rich at startup.

Closed-loop systems are expensive, and many systems can be tampered with by vehicle operators. Equally important, the ability of a closed-loop system to effect the carbon monoxide discharge by adjusting the air-to-fuel ratio is limited. If a propane powered vehicle drifts out of the range of the control exercisable by the closed-loop system, a warning light may come on to alert the operator. This light often is ignored by the vehicle operator for reasons explained above. The warning light may also burn out. Other warning systems may be ignored or bypassed. Accordingly, high workplace carbon monoxide levels result in unnecessary exposure to employees within buildings where propane powered vehicles are operating, and subject many employers to numerous health related claims.

The disadvantages of the prior art are overcome by the present invention, and an improved system and method are hereinafter disclosed for reliably controlling the operation of a vehicle engine to reduce the discharge of harmful contaminants. The system and method of the present invention are particularly well suited for requiring the operation of a propane powered engine in a slightly lean or stoichiometric mode.

SUMMARY OF THE INVENTION

A system for controlling the operation of a vehicle powered by propane includes a gas sensor for determining the oxygen concentration in the engine exhaust stream as an indication of the carbon monoxide concentration in the stream. A tachometer is mounted on the vehicle for sensing engine rpm. A controller receives signals from the gas sensor and the tachometer and determines acceptable engine operation based upon a minimum speed and the duration of a fuel rich signal from the gas sensor. A fuel shutoff device is provided for automatically terminating the fuel supply to the engine in response to an unacceptable engine operation signal from the controller which is not cured within a preselected time period.

In a preferred embodiment, the controller activates the fuel shutoff device when either the period of duration or the on-time percent of the fuel rich signal from the gas sensor exceeds predetermined values. An occasional fuel rich signal is expected, particularly when the vehicle is decelerating, and does not generate a service required signal indicative of unacceptable engine operation. The engine rpm signal may also be used to detect vehicle deceleration so that a brief fuel rich signal during or shorty after a vehicle deceleration is expected and is not interpreted by the controller as an indication of unacceptable engine operation. The controller is preferably sealed and is not adjustable by the vehicle operator. The controller may be mounted directly on the fuel shutoff device to effectively eliminate system tampering. The controller also actuates the fuel shutoff device when the period of duration of the fuel lean signal exceeds a predetermined value, which is indicative of either an improper air-to-fuel ratio or system tampering. A horn or other warning unit is used for alerting the operator of a service required signal from the controller. The controller preferably actuates the warning device in a predetermined sequence in response to the service required signal.

According to the method of the invention, a fuel lean signal or a stoichiometric signal will normally be forwarded from the gas sensor to the controller. If a fuel rich signal is received by the controller for a period of duration in excess of a preselected value, or if the percent on-time of the fuel rich signal exceeds a preselected percent, the controller generates a service required signal. The service required signal actuates a warning unit, such as a light or horn, for alerting the operator to the determination that vehicle service is required. If the service required signal continues for a predetermined period of time in excess of that normally required for the operator to terminate vehicle operation, the controller actuates a fuel shutoff device which automatically terminates the fuel supply to the engine. After vehicle shutdown, the vehicle may be restarted by the operator, although the service required signal will again be generated by the controller, so that normal operation of the vehicle is prohibited.

It is an object of the present invention to provide a system for controlling the operation of an engine so that an acceptable carbon monoxide concentration in the engine exhaust stream does not subject employees to an unsafe working environment. It is a related object of the invention to provide a system for controlling a vehicle engine whereby a period of duration of a fuel rich signal from a gas sensor is used to determine acceptable engine operation. A further object of the invention is a system for controlling vehicle operation which substantially minimizes or eliminates the likelihood of system tampering.

It is a feature of the invention that the vehicle engine controlled by the system of the present invention may reliably operate for periodic intervals in a fuel rich mode, but that operation of the engine will automatically terminate when the fuel rich mode occurs for an extended period of time or occurs too often. A further feature of the invention is a system for controlling the operation of a vehicle which may be easily adapted to various types and models of propane powered vehicles.

An advantage of the present invention is that the controller may both protect the engine from unsafe operation, and protect the environment from excessive contamination in the engine discharge stream. It is another advantage of the invention that a warning system is provided for informing the operator prior to engine shutdown, and for allowing the vehicle operator after engine shutdown to re-start the engine and return the vehicle to a service bay.

These and further objects, features and advantages of the present invention will become apparent from the following detailed description, wherein reference is made to the figures in the accompanying drawings.

DETAILED DESCRIPTION OF THE PREFERRED EMBODIMENTS

Figure 1:
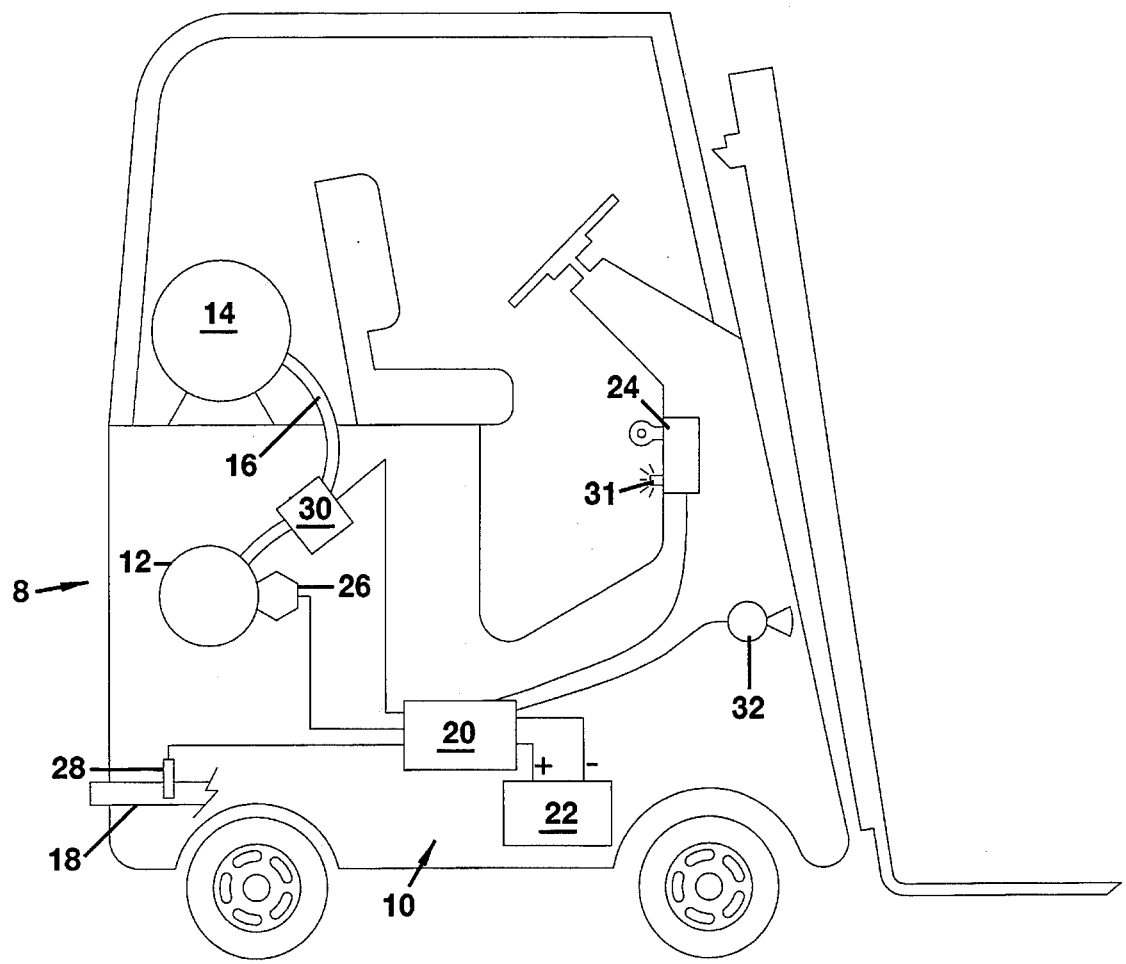
FIG. 1 is a simplified pictorial view of a forklift with a control system according to the present invention for regulating the operation of the vehicle engine.

FIG. 1 illustrates simplistically a forklift 8 including a system 10 according to the present invention for controlling the operation of the engine 12. The forklift includes a conventional fuel tank 14 supplying propane to the engine via supply line 16. The engine 12 discharges exhaust gas through pipe 18. Those skilled in the art will appreciate that the system of the present invention may be applied to various vehicles which typically operate within a building, such as a forklift, sweeper, or transport cart. The fuel for operating the engine may be liquid propane or natural gas, which are considered "alternative fuels" to conventional gasoline or diesel fuels. Propane (and to a lesser extent natural gas) are commonly used to power vehicles which operate within an enclosed or substantially enclosed building due to reduced discharge of carbon monoxide compared to gasoline or diesel powered vehicles.

The system 10 includes a controller 20, which preferably is a microprocessor chip potted or otherwise sealed so as to be non-adjustable. The controller is powered by a conventional vehicle battery 22, and preferably is activated any time it receives a POWER ON signal through starting switch 24. The controller 20 also receives an ENGINE RPM signal from tachometer 26. As explained further below, the controller may monitor the period of time the POWER ON signal is being received, and may also monitor when a tachometer signal is greater than a preselected value, e.g., 500 rpm, to determine the period of time a VEHICLE OPERATING signal is received.

Controller 20 also receives a signal from gas sensor 28 positioned for monitoring the oxygen concentration within the exhaust stream of pipe 18. The gas sensor 28 monitors the oxygen level in the gas stream as an indication of the carbon monoxide concentration in the stream. A suitable gas sensor is the OS-115 Model manufactured by Borg Warner, which includes a zirconia lambda sensor for detecting oxygen concentration. Various types of sensors may be used to monitor the concentration of oxygen, carbon monoxide, or other gasses in the engine exhaust stream.

The controller 20 generates a SERVICE REQUIRED signal as explained subsequently to actuate light 31, and also generates a WARNING signal to actuate horn 32. The controller 20 further generates a FUEL SHUTOFF signal to a fuel shutoff device 30 which is provided along the fuel line 16. The fuel lockout device includes a solenoid valve which prohibits flow of fuel to the engine 12, thereby terminating operation of the vehicle. A suitable shutoff device is the Model 1-1012 unit manufactured and sold by Algas Carburetion.

Each type of natural gas powered engine has a particular air-to-fuel ratio which is ideal for that engine to achieve the desired power output satisfactory to the operator, while also minimizing the discharge of harmful gasses, and particularly carbon monoxide, in the engine exhaust stream. This ideal air-to-fuel ratio is obtained when the engine is operating at its stoichiometric point, which arbitrarily may be assigned an air-to-fuel ratio of 1.0. The most efficient operation of a natural gas engine from a fuel standpoint is achieved when the engine is running in a fuel lean mode, e.g., when the air-to-fuel ratio is approximately 0.87. The maximum output from the engine is achieved when the engine is running with a slightly fuel rich mode, e.g., a 1.10 air-to-fuel ratio. As previously noted, the carbon monoxide in the engine exhaust stream is maintained at an acceptable level when the engine is running in either a fuel lean mode or at its stoichiometric point. If the engine is operating in a fuel rich mode, the carbon monoxide level in the engine exhaust stream increases markedly. When the air-to-fuel ratio is continually greater than, for example, 1.05, the carbon monoxide concentration in the exhaust stream may be considered unacceptable.

The premise of the invention is that an engine does not necessarily require service or adjustment if the air-to-fuel ratio briefly results in a fuel rich signal being received by the controller. More particularly, when a vehicle is decelerating with a load, a brief FUEL RICH signal is expected from a properly tuned engine being supplied with natural gas. On the other hand, if the FUEL RICH signal is continually received by the controller for a time in excess of a predetermined value, e.g., 5 minutes, the engine likely needs service to correct the air-to-fuel ratio. Similarly, if the vehicle is operating with the engine rpm in excess of a predetermined value, e.g., 500 rpm, and the FUEL RICH signal is thereafter received by the controller for a period in excess of 4 minutes during any 10 minute time period, engine service is likely required.

The invention further recognizes that, while a FUEL LEAN signal generally is indicative of an acceptable output of carbon monoxide in the engine exhaust, a FUEL LEAN signal continuously received by the controller for a period in excess of 10 minutes when the engine rpm is above 500 is likely indicative of either an improperly tuned engine or a system malfunction. During that 10 minute period, vehicle deceleration likely will occur, and such deceleration should result in an occasional FUEL RICH signal to the controller if the engine is properly tuned. The absence of a FUEL RICH signal from the gas sensor during a substantial period of time is thus interpreted by the system as a warning that the system may be malfunctioning or that the engine is running too lean (the air-to-fuel ratio is set too far from stoichiometric). According to a preferred embodiment, a SERVICE REQUIRED, a WARNING, and a FUEL SHUTOFF signal are generated by controller 20 when a FUEL RICH signal is not received by the controller during a period when the ENGINE RPM signal indicates rapid vehicle deceleration. The absence of a FUEL RICH signal during rapid vehicle deceleration is thus interpreted by the controller as an indication that the engine is set too lean. Accordingly, the absence of a FUEL RICH signal during a preselected time period, when combined with an ENGINE RPM signal which indicates rapid vehicle deceleration during that time period (or, for example, two vehicle decelerations during that time period), may thus result in a FUEL SHUTOFF signal to device 30.

Figure 2:
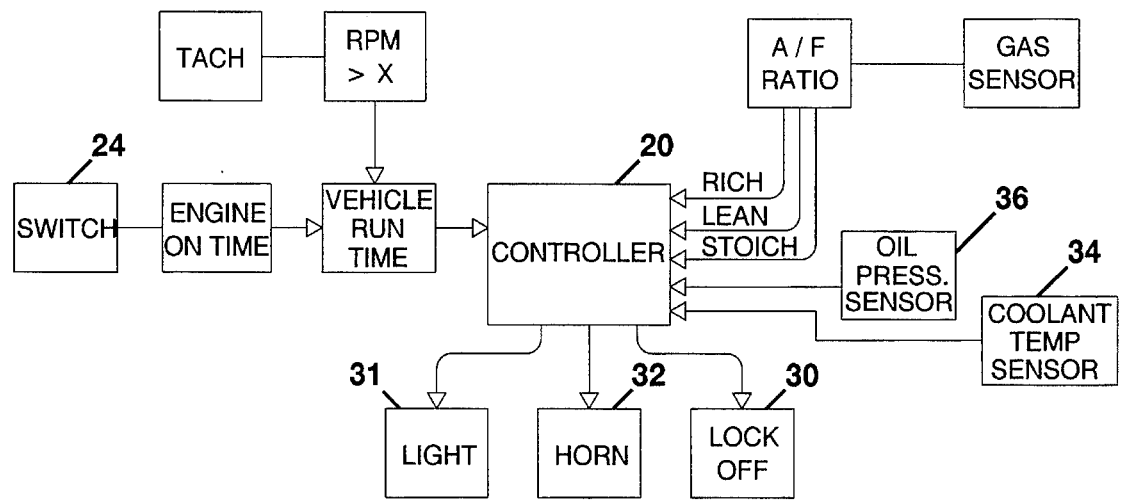
FIGS. 2 and 4 are block diagrams of suitable control system according to this invention.

FIG. 2 illustrates the operation of a controller 20 to regulate the operation of a vehicle engine powered by natural gas such that an acceptable level of carbon monoxide is discharged in the engine exhaust stream. The controller may monitor the POWER ON time by running a clock initiated by a signal from the on/off switch 24. An rpm signal from tachometer 26 may be used to simultaneously monitor VEHICLE RUN operation time when the engine rpm is greater than idle speed. Very little carbon monoxide is generated when an engine is idling, and it may be convenient to actively monitor the contaminant level in the engine exhaust gas only when the engine is operating at an rpm greater than idle speed. A signal from gas sensor 28 is input to an air-to-fuel ratio monitor, which outputs either a fuel rich signal, a fuel lean signal, or a stoichiometric point signal to the controller. Alternatively, an analog signal from the sensor 28 may be input directly to the controller 20, so that the value of the signal from sensor 28 enables the controller 20 to determine when the engine is running fuel rich, fuel lean, or at stoichiometric point.

In response to these signals, the controller 20 determines a fuel rich period, which is the period of time when a fuel rich signal has been continuously received by the gas sensor. The controller also determines a fuel lean period, which similarly is the time period that a fuel lean signal has been continuously received. The controller may also generate a percent fuel rich on-time and a percent fuel lean on-time, which are indicative of the percent of the time these signals have been received by the controller for a given time period, e.g., for the last thirty minutes when the engine speed is in excess of idle.

Based upon these determinations by the controller, the controller may generate a SERVICE REQUIRED signal, which may actuate any type of conventional warning device, such as light 31. According to a preferred embodiment, if the SERVICE REQUIRED signal is continuously generated for a period in excess of, for example, 30 seconds, a WARNING signal may be generated which will cause the activation of horn 32. In a preferred embodiment, a WARNING signal to the horn causes the horn to blow in a predetermined sequence and for a predetermined time period, thereby serving as a warning device to both the operator and adjacent personnel. If the WARNING signal thereafter remains on for another period of time, e.g., 60 seconds, the controller will generate a FUEL SHUTOFF signal to the shutoff device 30, thereby automatically terminating operation of the engine.

During normal operation, the controller will not generate SERVICE REQUIRED or WARNING signals, thereby minimizing distractions to the vehicle operator. The vehicle engine will normally operate in a fuel lean or stoichiometric mode, although FUEL RICH signals will be intermittently forwarded to the controller, as explained above. Since the controller is monitoring engine rpm, a FUEL RICH signal may be considered acceptable during and briefly after a period when the engine rpm reduces rapidly, indicating vehicle deceleration. If the controller makes a determination that engine service is required, the ENGINE SERVICE signal may actuate the initial warning device, such as a light 31 easily visible by the vehicle operator. In some cases, this light will provide an indication which will allow the operator to return the vehicle to a service bay and prevent activation of the horn in response to the WARNING signal, thereby alerting adjacent personnel to the condition of the vehicle. Once driven to a service bay, the vehicle may be serviced and the air-to-fuel ratio checked and adjusted.

If the vehicle is not returned to the service bay after a preselected period of time, e.g., 60 seconds, after the WARNING signal is continuously maintained, the controller will automatically generate a SHUTOFF signal, which will cause the immediate termination of fuel to the engine. According to one embodiment, a POWER OFF signal from the switch 24 will deactivate the controller, so that the vehicle may thereafter be restarted. Since the vehicle operation has not changed, the process will likely be repeated and the vehicle again shut down if not returned to a service bay. Alternatively, power may be applied to the controller even when the switch 24 is off. The controller may thus retain the FUEL SHUTOFF signal to the lockout device 30 for a preselected period of time, e.g., 60 seconds. Thereafter, the SHUTOFF signal may be released by the controller, so that the operator may then restart the vehicle. Since the air-to-fuel ratio has not been adjusted, the process will be repeated and the controller will again terminate fuel supply to the engine. This sequence should lead the vehicle operator to return the vehicle to a service bay. If desired, the controller may increase the time period when the vehicle is deactivated by sequentially increasing the time before the fuel shutoff signal is released by the controller.

The controller 20 may also be used to insure safe engine operation. The controller 20 may thus receive a coolant temperature signal from a sensor 34, and an engine oil pressure signal from a sensor 36. These signals may cause the activation of light 31 and horn 32 as previously discussed, and will result in fuel shutoff to the engine if a signal either exceeds an acceptable level, or exceeds an undesirable level beyond a selected period of time. The controller 20 may cause the light to turn on and off in a predetermined sequence, even after the fuel supply to the engine has been terminated. A blinking light, which alternatively may be mounted directly on the controller, may thus be used as a diagnostic tool to determine why the engine was shut down. Also, the horn may be activated in a predetermined sequence, so that the vehicle operator can distinguish between a warning signal indicative of low oil pressure and a warning signal indicative of an unacceptable carbon monoxide concentration.

Figure 3:
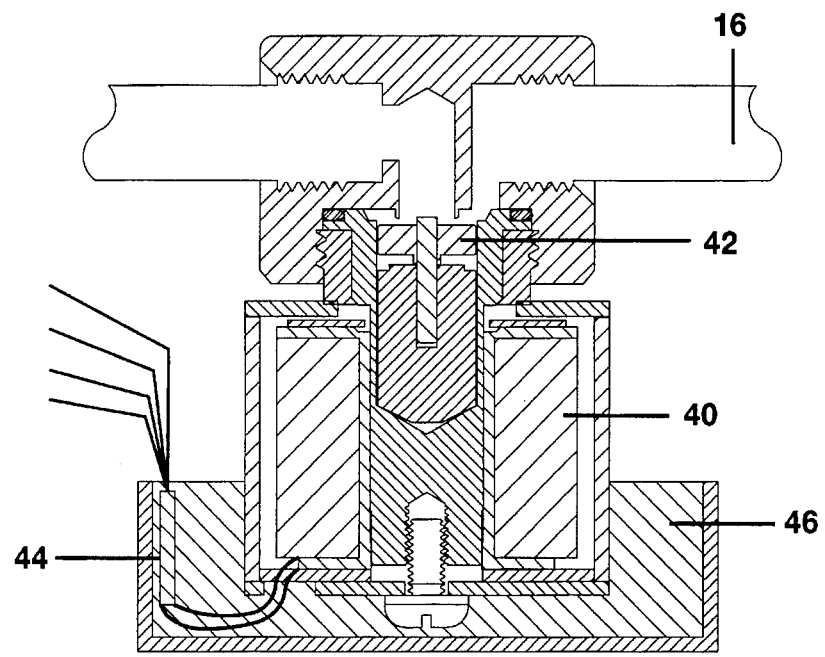
FIG. 3 illustrates a controller according to the present invention mounted on a fuel shutoff device.
Figure 4:
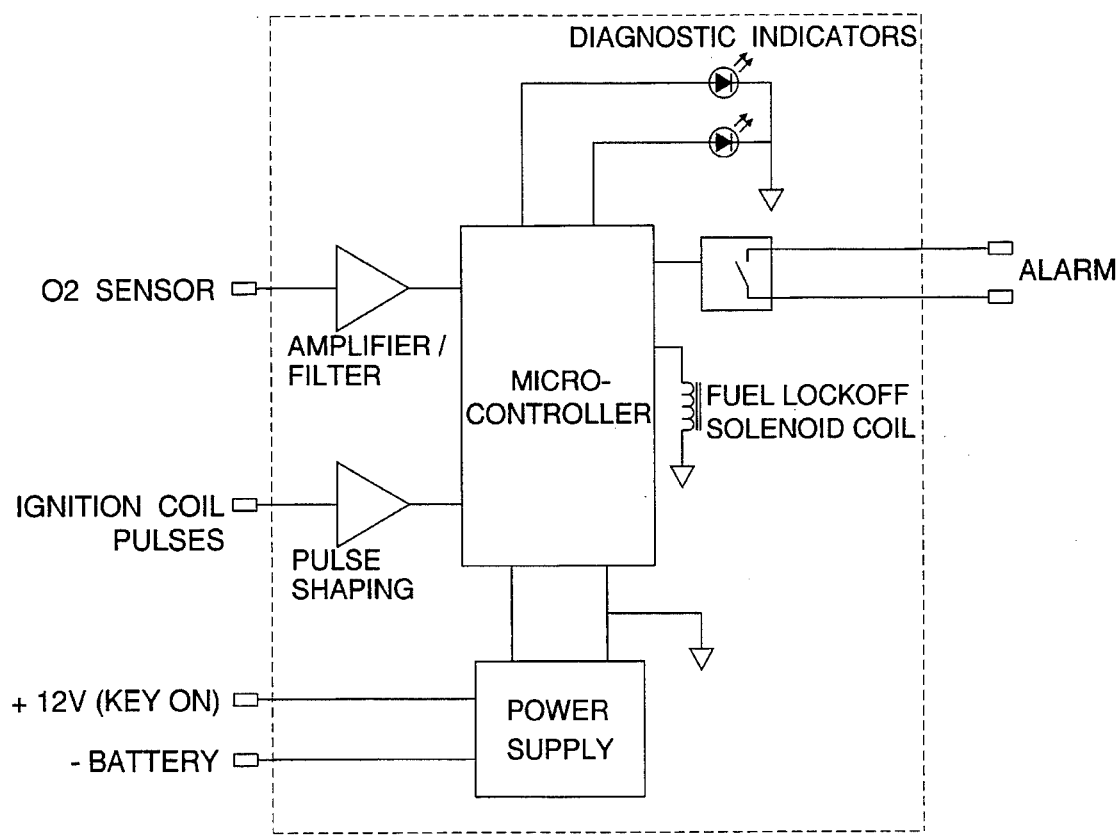

FIG. 3 illustrates a suitable lockoff device 30 along a fuel line 16, and more specifically illustrates the general configuration of an electrically powered solenoid 40 for opening and closing a valve 42 within the line 16. The controller 20 is preferably mounted directly on the shutoff device 30, and may comprise a computer chip 44 potted or encased in a protective sealant 46 to prevent tampering. If any input lines to the controller 20 are cut, the controller will sense the condition and may automatically generate the FUEL SHUTOFF signal. Any electrical lines between the controller 20 and the shutoff device 30 are encased in the protective sealant. The above construction thus significantly minimizes the likelihood of system tampering.

The system of the present invention may be adapted to various types of vehicles. The system is particularly well suited for use with propane powered vehicles, although the system could be used with vehicles powered by natural gas or other hydrocarbon fuels. The system is able to reliably maintain the operation of a vehicle in a fuel lean or stoichiometric mode during the desired percent of time the engine is on, and accomplishes this goal at a cost significantly less than closed-loop systems. The system is highly reliable, and directly effects vehicle operation in a manner contrary to closed-loop systems.

The foregoing description of the invention has been directed in primary part to a preferred embodiment in accordance with the requirements of the patent statutes and for purposes of illustration. It will be apparent, however, to those skilled in the art that many modifications and changes in the specifically described vehicular fuel control system and method may be made without departing from the scope and spirit of the invention. Therefore, the invention is not restricted to the preferred embodiments illustrated, and instead includes modifications which may fall within the scope of the following claims.

What is claimed is:

1. A system for controlling the operation of an engine powering a vehicle, the vehicle carrying a fuel supply to power the engine while discharging engine exhaust in an exhaust stream, the system comprising:

a gas sensor mounted on the vehicle for sensing concentration of a gas in the exhaust stream, the gas sensor providing a fuel rich signal indicative of excessive fuel operation of the engine;

a controller mounted on the vehicle for receiving signals from the gas sensor, the controller determining unacceptable engine operation as a function of the period of duration of the fuel rich signal, and for outputting a service required signal and a fuel shutoff signal in response to the unacceptable engine determination;

a warning unit for alerting a vehicle operator in response to the service required signal; and a fuel shutoff device responsive to the fuel shutoff signal for automatically terminating the fuel supply to the engine;

the controller being mounted on the fuel shutoff device and sealingly encased to prevent tampering.

2. The system as defined in claim 1, further comprising:

a tachometer mounted on the vehicle for sensing the engine rpm and generating an engine speed signal; and the controller determines unacceptable engine operation as a function of the period of duration of fuel rich signal when the engine speed signal is greater than a preselected value.

3. The system as defined in claim 1, wherein the controller outputs the service required signal when the fuel rich signal is generated for a period in excess of a preselected value.

4. The system as defined in claim 1, wherein the controller outputs a service required signal when the on-time percent of the fuel rich signal exceeds a preselected value.

5. The system as defined in claim 1, further comprising:

a tachometer mounted on the vehicle for sensing engine rpm and generating an engine speed signal; and the controller disregards the fuel rich signal from the gas sensor when the engine speed signal is decelerating.

6. The system as defined in claim 1, wherein:

the gas sensor provides a fuel lean signal indicative of lean fuel operation of the engine; and the controller outputs a service required signal when the fuel lean signal is generated for a period in excess of a preselected value.

7. The system as defined in claim 1, wherein the fuel shutoff device is an electrically operated solenoid positioned along a fuel supply line between the fuel supply and the engine.

8. The system as defined in claim 1, wherein the warning unit is a horn, and the controller generates a warning signal which activates the horn in a predetermined sequence.

9. A system for controlling the operation of a vehicle engine powered by propane, the vehicle carrying a propane fuel supply to power the engine while discharging engine exhaust in an exhaust stream, the system comprising:

an oxygen sensor mounted on the vehicle for sensing oxygen concentration in the exhaust stream as an indication of carbon monoxide concentration in the exhaust stream, the oxygen sensor providing a fuel rich signal indicative of excess fuel operation of the engine, and a fuel lean signal indicative of lean fuel operation of the engine;

a tachometer mounted on the vehicle for sensing the engine speed and generating an engine speed signal;

a controller mounted on the vehicle for receiving signals from the gas sensor and the tachometer, the controller determining unacceptable engine operation as a function of the engine speed signal, the period of duration of the fuel rich signal, the on-time percent of the fuel rich signal, and the period of duration of the fuel lean signal, the controller outputting a service required signal and a fuel shutoff signal in response to the unacceptable engine determination;

a warning unit for alerting a vehicle operator in response to the service required signal;

a fuel shutoff device including an electrically operated solenoid positioned along a fuel supply line between the fuel supply and the engine, the fuel shutoff device being responsive to the fuel shutoff signal for automatically terminating the propane fuel supply to the engine; and the controller automatically releases the fuel shutoff signal to the fuel shutoff device after a preselected time, so that the engine may thereafter be restarted.

10. The system as defined in claim 9, wherein the controller determines unacceptable engine operation as a function of the period of duration of fuel rich signal and the period of duration of the lean fuel signal when (a) the engine speed signal is greater than a preselected value, and (b) the engine speed is not decelerating.

11. The system as defined in claim 9, wherein the controller outputs the service required signal when any one of the period of duration of the fuel rich signal, the on-time percent of the fuel rich signal, and the period of duration of the lean fuel signal exceed a preselected value.

12. The system as defined in claim 9, wherein the warning unit is a horn, and the controller generates a warning signal which activates the horn in a predetermined sequence.

13. A method of controlling the operation of an engine powering a vehicle, the vehicle carrying a fuel supply to power the engine while discharging engine exhaust in an exhaust stream, the method comprising:

sensing gas concentration in the exhaust stream;

generating a fuel rich signal indicative of excessive fuel operation of the engine in response to the sensed gas concentration;

determining unacceptable engine operation as a function of the period of duration of the fuel rich signal and determining when the on-time percent of the fuel rich signal exceeds a preselected value;

generating a service required signal and a fuel shutoff signal in response to the unacceptable engine determination;

automatically alerting a vehicle operator in response to the service required signal; and automatically terminating the fuel supply to the engine in response to the fuel shutoff signal.

14. The method as defined in claim 13, further comprising:

sensing the engine rpm; and determining unacceptable engine operation includes determining when the period of duration of fuel rich signal exceeds a preselected value while the sensed engine rpm is greater than a preselected value.

15. The method as defined in claim 13, further comprising:

sensing the engine rpm; and disregarding the fuel rich signal when the sensed engine rpm indicates that the vehicle is decelerating.

16. The method as defined in claim 13, further comprising:

generating a lean fuel signal indicative of lean fuel operation of the engine in response to the sensed gas concentration; and generating a service required signal and a fuel shutoff signal when the fuel lean signal is generated for a period in excess of a preselected value.

17. The method as defined in claim 13, wherein automatically alerting the vehicle operator comprises:

actuating a horn in a predetermined sequence.

18. A system for controlling the operation of an engine powering a vehicle, the vehicle carrying a fuel supply to power the engine while discharging engine exhaust in an exhaust stream, the system comprising:

a gas sensor mounted on the vehicle for sensing concentration of a gas in the exhaust stream, the gas sensor providing a fuel rich signal indicative of excessive fuel operation of the engine;

a controller mounted on the vehicle for receiving signals from the gas sensor, the controller determining unacceptable engine operation as a function of the period of duration of the fuel rich signal, and outputting a service required signal when the on-time percent of the fuel rich signal exceeds a preselected value, and outputting a fuel shutoff signal in response to the unacceptable engine determination;

a warning unit for alerting a vehicle operator in response to the service required signal; and a fuel shutoff device responsive to the fuel shutoff signal for automatically terminating the fuel supply to the engine.

19. The system as defined in claim 18, further comprising:

a tachometer mounted on the vehicle for sensing the engine rpm and generating an engine speed signal; and the controller determines unacceptable engine operation as a function of the period of duration of fuel rich signal when the engine speed signal is greater than a preselected value.

20. The system as defined in claim 18, wherein the controller outputs the service required signal when the fuel rich signal is generated for a period in excess of a preselected value.

21. The system as defined in claim 18, further comprising:

a tachometer mounted on the vehicle for sensing engine rpm and generating an engine speed signal; and the controller disregards the fuel rich signal from the gas sensor when the engine speed signal is decelerating.

22. The system as defined in claim 18, wherein:

the gas sensor provides a fuel lean signal indicative of lean fuel operation of the engine; and the controller outputs a service required signal when the fuel lean signal is generated for a period in excess of a preselected value.

23. The system as defined in claim 18, wherein the fuel shutoff device is an electrically operated solenoid positioned along a fuel supply line between the fuel supply and the engine.

24. The system as defined in claim 18, wherein the warning unit is a horn, and the controller generates a warning signal which activates the horn in a predetermined sequence.

25. A system for controlling the operation of an engine powering a vehicle, the vehicle carrying a fuel supply to power the engine while discharging engine exhaust in an exhaust stream, the system comprising:

a gas sensor mounted on the vehicle for sensing concentration of a gas in the exhaust stream, the gas sensor providing a fuel rich signal indicative of excessive fuel operation of the engine;

a tachometer mounted on the vehicle for sensing engine rpm and generating an engine speed signal;

a controller mounted on the vehicle for receiving signals from the gas sensor, the controller determining unacceptable engine operation as a function of the period of duration of the fuel rich signal and disregarding the fuel rich signal from the gas sensor when the engine speed is decelerating, and outputting a service required signal and a fuel shutoff signal in response to the unacceptable engine determination;

a warning unit for alerting a vehicle operator in response to the service required signal; and a fuel shutoff device responsive to the fuel shutoff signal for automatically terminating the fuel supply to the engine.

26. The system as defined in claim 25, wherein:

the controller determines unacceptable engine operation as a function of the period of duration of fuel rich signal when the engine speed signal is greater than a preselected value.

27. The system as defined in claim 25, wherein the controller outputs the service required signal when the fuel rich signal is generated for a period in excess of a preselected value.

28. The system as defined in claim 25, wherein:

the gas sensor provides a fuel lean signal indicative of lean fuel operation of the engine; and the controller outputs a service required signal when the fuel lean signal is generated for a period in excess of a preselected value.

29. The system as defined in claim 25, wherein the fuel shutoff device is an electrically operated solenoid positioned along a fuel supply line between the fuel supply and the engine.

30. The system as defined in claim 25, wherein the warning unit is a horn, and the controller generates a warning signal which activates the horn in a predetermined sequence.

31. A method of controlling the operation of an engine powering a vehicle, the vehicle carrying a fuel supply to power the engine while discharging engine exhaust in an exhaust stream, the method comprising:

sensing gas concentration in the exhaust stream;

sensing the engine rpm;

generating a fuel rich signal indicative of excessive fuel operation of the engine in response to the sensed gas concentration;

disregarding the fuel rich signal when the sensed engine rpm indicates that the vehicle is decelerating;

determining unacceptable engine operation as a function of the period of duration of the fuel rich signal;

generating a service required signal and a fuel shutoff signal in response to the unacceptable engine determination;

automatically alerting a vehicle operator in response to the service required signal; and automatically terminating the fuel supply to the engine in response to the fuel shutoff signal.

32. The method as defined in claim 31, wherein determining unacceptable engine operation includes determining when the period of duration of fuel rich signal exceeds a preselected value while the sensed engine rpm is greater than a preselected value.

33. The method as defined in claim 31, wherein determining unacceptable engine operation includes determining when the on-time percent of the fuel rich signal exceeds a preselected value.

34. The method as defined in claim 31, further comprising:

generating a lean fuel signal indicative of lean fuel operation of the engine in response to the sensed gas concentration; and generating a service required signal and a fuel shutoff signal when the fuel lean signal is generated for a period in excess of a preselected value.

35. The method as defined in claim 31, wherein automatically alerting the vehicle operator comprises:

actuating a horn in a predetermined sequence.

* * * * *